United States Patent
Zamer

(10) Patent No.: US 10,579,223 B2
(45) Date of Patent: Mar. 3, 2020

(54) TRUSTED DEVICE IDENTIFICATION AND EVENT MONITORING

(71) Applicant: eBay Inc., San Jose, CA (US)

(72) Inventor: Kamal Zamer, Austin, TX (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 15/623,236

(22) Filed: Jun. 14, 2017

(65) Prior Publication Data

US 2017/0285892 A1    Oct. 5, 2017

Related U.S. Application Data

(63) Continuation of application No. 14/586,636, filed on Dec. 30, 2014, now Pat. No. 9,684,433.

(51) Int. Cl.
*G06F 3/0482* (2013.01)
*H04L 12/58* (2006.01)
(Continued)

(52) U.S. Cl.
CPC ............ *G06F 3/0482* (2013.01); *G06F 21/44* (2013.01); *G06F 21/554* (2013.01); *G06F 21/57* (2013.01);
(Continued)

(58) Field of Classification Search
CPC . H04L 41/0893; H04L 43/08; H04L 41/5051; H04L 47/20; H04L 43/10; H04L 67/22; H04L 67/02; H04L 67/306; H04L 67/10; H04L 51/32; H04L 65/403; H04L 65/4084; H04L 51/10; H04L 65/1089; H04L 65/4092; H04L 67/12; H04L 12/6418; H04L 12/2825; H04L 12/2818; H04L 12/2823; H04L 41/00; H04L 41/12; H04L 51/02; H04L 67/00; H04L 12/417; H04L 41/0604; H04L 41/0645; H04L 41/0681; H04L 41/069; H04L 43/0817; H04L 51/046; H04L 51/12; H04L 51/14; H04L 51/18; H04L 65/60; H04L 65/601;
(Continued)

(56) References Cited

U.S. PATENT DOCUMENTS 9,684,433 B2    6/2017  Zamer
2008/0162133 A1  7/2008  Couper et al.
(Continued)

*Primary Examiner* — Djenane M Bayard
(74) *Attorney, Agent, or Firm* — Maschoff Brennan

(57) ABSTRACT

A method of event monitoring includes identifying a monitored event that produces a physical phenomenon that is observable and identifiable. The method includes identifying a particular input that is representative of the physical phenomenon and that suggests an occurrence of the monitored event. The method includes communicating, from the first computing device, to a second computing device that includes a sensor at least a portion of the particular input that is used for recognition of the monitored event in an environment of the second computing device by the sensor. The method includes receiving, at the first computing device from the second computing device, an event message that indicates the particular input is observed by the sensor. In response to reception of the event message, the method includes generating an alarm message that indicates the occurrence of the monitored event is observed in the environment of the second computing device.

19 Claims, 7 Drawing Sheets

(51) Int. Cl.
*H04W 4/02* (2018.01)
*G06F 21/44* (2013.01)
*G06F 21/55* (2013.01)
*G06F 21/57* (2013.01)
*H04L 29/08* (2006.01)

(52) U.S. Cl.
CPC ............ *H04L 51/046* (2013.01); *H04L 51/32* (2013.01); *H04W 4/023* (2013.01); *H04L 67/306* (2013.01)

(58) Field of Classification Search
CPC . H04L 61/6022; H04L 41/22; H04L 67/1095; H04L 67/2823; H04L 67/42; H04L 69/08; H04L 12/189; H04L 51/38; H04L 61/103; H04L 61/2514; H04L 61/2589; H04L 63/0281; H04L 63/029; H04L 63/0428; H04L 63/0492; H04L 63/08; G06F 19/30; G06F 19/32; G06F 19/34; G06F 19/00; G06F 19/3456; G06F 17/5009; G06F 19/3475; G06F 1/163; G06F 11/261; G06F 1/266; G06F 1/3287; G06F 21/44; G06F 21/554; G06F 21/57; G06F 2200/261; G06F 3/0482; G06F 3/167
See application file for complete search history.

(56) References Cited

U.S. PATENT DOCUMENTS

| | | | |
|---|---|---|---|
| 2010/0115093 A1* | 5/2010 | Rice | H04W 4/70 709/224 |
| 2011/0113086 A1 | 5/2011 | Long et al. | |
| 2011/0307403 A1 | 12/2011 | Rostampour et al. | |
| 2013/0124192 A1 | 5/2013 | Lindmark et al. | |
| 2015/0180705 A1* | 6/2015 | Beheshti-Zavareh | H04L 45/64 370/218 |
| 2015/0180708 A1 | 6/2015 | Jacob et al. | |
| 2015/0180746 A1 | 6/2015 | Day, II et al. | |
| 2015/0347910 A1 | 12/2015 | Fadell et al. | |
| 2015/0348398 A1 | 12/2015 | Williamson | |
| 2015/0382085 A1* | 12/2015 | Lawrie-Fussey | G06K 19/0717 340/870.07 |
| 2017/0018164 A1* | 1/2017 | Warren | G08B 25/10 |

* cited by examiner

TRUSTED DEVICE IDENTIFICATION AND EVENT MONITORING

CROSS-REFERENCE TO RELATED APPLICATIONS

This application is a continuation of U.S. patent application Ser. No. 14/586,636, filed Dec. 30, 2014, now U.S. Pat. No. 9,684,433, which is incorporated herein by reference in its entirety.

FIELD

The embodiments discussed herein are related to trusted device identification and event monitoring.

BACKGROUND

Property and individuals may be vulnerable to the occurrence of events that may benefit from swift resolution and interaction of an owner or a caregiver. The occurrence of the events may produce a particular reaction. For example, when a water heater ruptures, an audio alarm may be triggered or when a child is injured, she may cry or scream. However, the owner or the caregiver may not be present to observe the particular reaction. Accordingly, the occurrence of the events may go unnoticed, which may exacerbate a consequence of the event.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
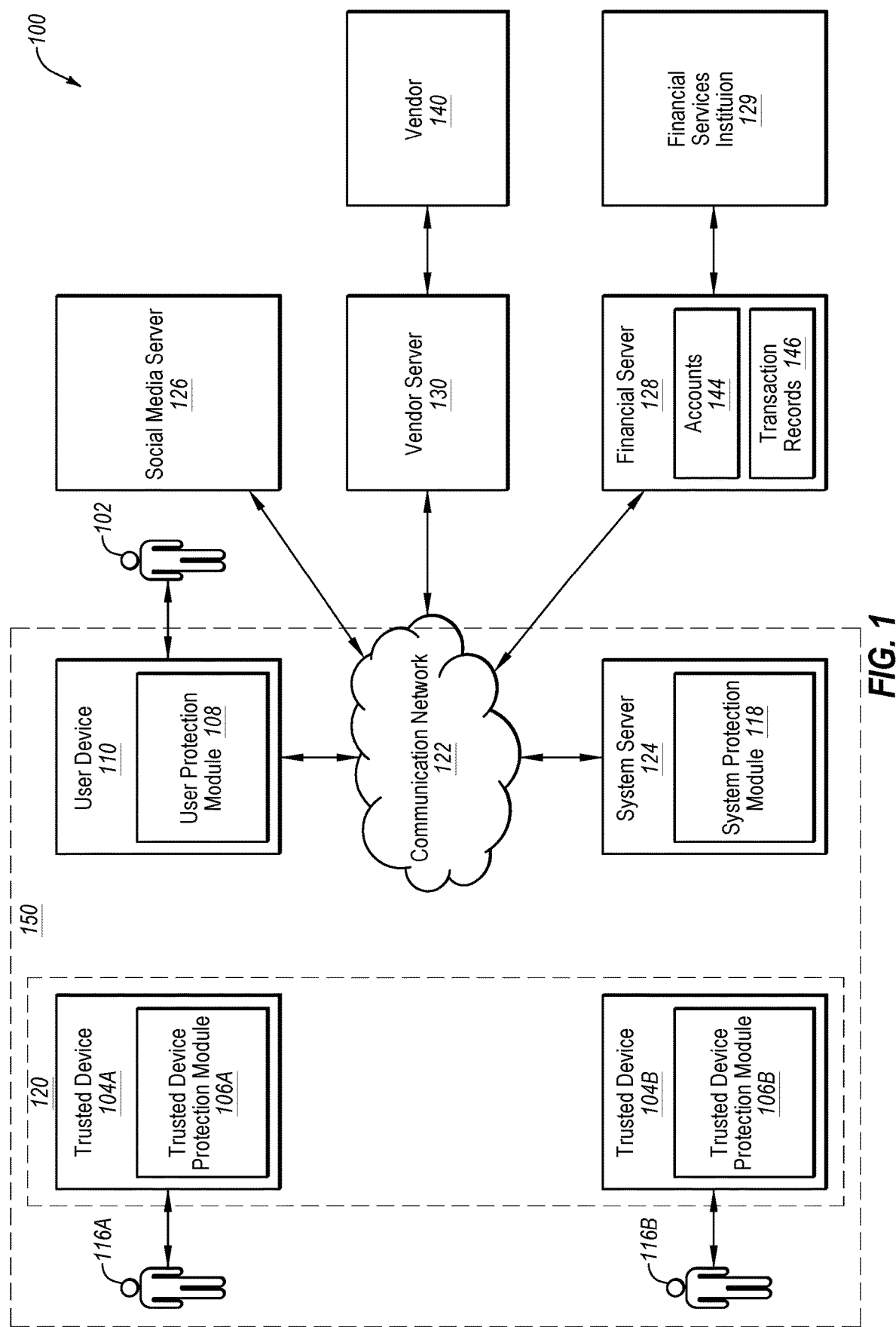
FIG. 1 illustrates an example operating environment in which a protection system may be implemented.

Some embodiments described herein relate to trusted device identification and event monitoring by one or more trusted devices. Generally, in some embodiments one or more individuals are identified from affiliations between the individuals and a user. The devices associated with the individuals, which are referred to herein as trusted devices, are then incorporated into an event monitor network. The individuals identified as being affiliated with a user may be referred to as affiliated individuals in the present disclosure.

The event monitor network is configured to monitor for an occurrence of a monitored event. The event monitor network may be specific to the user.

After incorporation into the event monitor network, the trusted devices may then be implemented to monitor for a particular input that suggests the occurrence of the monitored event and to alert the user when the particular input is observed. The user may then become aware of the monitored event and take corrective action. Additionally, in some embodiments, location data of the trusted devices may be used to determine a location of the monitored event that a source of the monitored event is an event location associated with the monitored event.

The affiliated individuals may be identified from a myriad of interactions between the affiliated individuals and the user. For example, interactions via social media, financial transactions, contact lists in a user device associated with the user, similar location patterns between the affiliated individuals and the user, or some combination thereof may be used to identify the affiliated individuals. The interactions may be identified using application program interface (API) calls, a web crawler, or any other applicable data surveying or requesting operation.

In an example embodiment, the affiliated individuals may include neighbors that are identified via rent payments to a common landlord via a financial server or maintenance workers who perform maintenance at or near the property. The trusted devices may include smartphones of the affiliated individuals, and the monitored event may include a water heater rupture, which may trigger an audio alarm. The smartphones may be configured to receive general audio input via the microphone of the smartphones as the affiliated individuals use and transport the smartphones. The smartphones may be further configured to recognize the audio alarm from the general audio input. In response to observing the audio alarm, the smartphones may generate an event message and communicate it to a smartphone of the user.

As another example, a method includes identifying individuals that are affiliated with a user. The method includes incorporating trusted devices associated with the identified individuals into an event monitor network that is configured to monitor for an occurrence of a monitored event. The method includes identifying a particular input that suggests the occurrence of the monitored event. The method includes communicating to the trusted devices, an input sample that is used for recognition of the particular input from general input that is measured by sensors of the trusted devices. The method includes receiving from at least one of the trusted devices, an event message that indicates the particular input is observed by at least one of the sensors. In response to the event message, the method includes communicating to a user interface of a user device associated with the user, an alarm message that indicates the occurrence of the monitored event.

Turning to the figures, FIG. 1 illustrates an example operating environment 100 in which an example protection system 150 may be implemented, according to at least one embodiment. The protection system 150 may include an event monitor network 120. The event monitor network 120 may be configured to monitor for an occurrence of an event (a "monitored event") and that is specific to a user 102. In particular, the event monitor network 120 may include one or more trusted devices 104. In the illustrated example, the monitor network 120 is depicted as including a trusted device 104A and a trusted device 104B. The trusted devices 104 may be configured to monitor general input for a particular input that suggests the occurrence of the monitored event. In response to observation of the particular input, the trusted devices 104 may communicate an event message to a user device 110 and/or a system server 124. The event message or some message derived therefrom may inform the user 102 of the occurrence of the monitored event via the user device 110.

The operating environment 100 of FIG. 1 may further include a social media server 126, a vendor server 130, a financial server 128, and a communication network 122. The trusted devices 104, the user device 110, the system server 124, the social media server 126, the vendor server 130, and the financial server 128 (collectively, environment components) may communicate information and data via the communication network 122. One or more of the components of the operating environment 100 ("environment components") may communicate information and data related to event monitoring. For example, the trusted devices 104, the user device 110, the system server 124, or some combination thereof, may be configured to perform operations related to event monitoring. Each of the environment components is briefly described in the following paragraphs.

The communication network 122 may include a wired network, a wireless network, or any combination thereof. The communication network 122 may include any suitable configuration or configurations including a star configuration, token ring configuration, or other configurations. The communication network 122 may include a local area network (LAN), a wide area network (WAN) (e.g., the Internet), and/or other interconnected data paths across which multiple devices may communicate. In some embodiments, the communication network 122 may include a peer-to-peer network. The communication network 122 may also be coupled to or include portions of a telecommunications network that may enable communication of data in a variety of different communication protocols. In some embodiments, the communication network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The vendor server 130 may include a hardware server that includes a processor, memory, and network communication capabilities. The vendor server 130 may be configured for communication with one or more other environment components via the communication network 122.

The vendor 140 may include any entity that may be engaged in some economic activity such as offering for sale goods or services. In some embodiments, the vendor 140 may include a merchant, a landlord, a service providing entity, etc. The vendor server 130 may be associated with a vendor 140. For example, an association between the vendor server 130 and the vendor 140 may include enabling or facilitating economic activities of the vendor 140 via the vendor server 130, storage of records of financial transactions of the vendor 140 at the vendor server 130, enabling access to records of financial transactions of the vendor 140 via the vendor server 130, hosting by the vendor server 130 a website of the vendor 140, general ownership or operation of the vendor server 130 by the vendor 140, and communicating information and data by the vendor 140 via the vendor server 130 to and from other environment components.

In some embodiments, the user 102 may execute a financial transaction with the vendor 140, which may be executed via the vendor server 130 in some instances. Additionally, a record of a financial transaction with the vendor 140 may be stored on or accessed via the vendor server 130. In these and other embodiments, individuals 116A and 116B (generally, individuals 116 or individual 116) may execute a financial transaction with the vendor 140 via the vendor server 130. Additionally, a record of a financial transaction with the vendor 140 may be stored on or accessed via the vendor server 130.

The financial server 128 may include a hardware server that includes a processor, memory, and network communication capabilities. The financial server 128 may be configured for communication with one or more other environment components via the communication network 122.

The financial server 128 may enable financial transactions by the user 102 and the individuals 116 with the vendor 140 and between the user 102 and the individuals 116. For example, the financial server 128 may include information related to one or more accounts 144 that may be managed by a financial services institution 129. The accounts 144 may be held by the user 102, the individuals 116, and the vendor 140. In some embodiments, the financial server 128 may enable transfers of funds between the accounts 144 or to accounts managed by other institutions (e.g., banks) that may be held by the user 102, the individuals 116, and/or the vendor 140. For example, to purchase a good from the vendor 140, the user 102 may transfer funds from one of the accounts 144 held by the user 102 to another of the accounts 144 held by the vendor 140. Similarly, to pay a first individual 116A, the user 102 may transfer funds from one of the accounts 144 held by the user 102 to another of the accounts 144 held by the first individual 116A.

The financial server 128 may include transaction records 146. The transaction records 146 may record parties (e.g., the vendor 140, the user 102, the individuals 116) involved in a transaction, a date of a transaction, an amount of funds transferred in a transaction, the accounts 144 involved in a transaction, other accounts linked to the accounts 144 involved in a transaction, other transaction details, or some combination thereof. In some embodiments the transaction records 146 or some subset of the information contained therein may be accessed via the financial server 128.

The social media server 126 may include a hardware server that includes a processor, memory, and network communication capabilities. In the illustrated implementation, the social media server 126 is configured to communicate via the communication network 122 with the other environment components.

The social media server 126 may be configured to support a social network. The social network may include a social structure in which the user 102, the individuals 116, the vendor 140, the financial services institution 129 and/or multiple other entities may be connected by a common feature. The common feature may include relationships or connections such as friendship, family, work, an interest, and the like. The common features may be provided by the social media server 126. For example, the social media server 126 may be configured to provide explicitly defined relationships and relationships implied by social connections between online users. The relationships and/or the common features may form a social graph in the social network. In some examples, the social graph may reflect a mapping of the online users and how they may be related.

The social network may enable or provide interfaces that enable various social network activities. For example, the social network may provide a data feed for one or more users of the social network in which one or more of the users may post messages or media, the social network may enable individuals to be tagged in photographs and videos posted on the social network, and the social network may provide an invitation interface in which the users may collectively or individually invite other users to calendar events and receive RSVPs to the calendar events.

In addition, the social network may provide payment features that may enable the users to submit payments via the social network. In some embodiments, the social media server 126 may interface with the financial server 128 and/or the vendor server 130 to enable execution of financial transactions from the social network.

The social media server 126 may be responsive to data requests such as application programming interface (API) calls. The data requests may request data related to one of the users and the social network activities associated with the corresponding user.

The trusted devices 104 and the user device 110 may include computing devices that may include a processor, memory, and network communication capabilities. The trusted devices 104 and the user device 110 may be configured for communication with one or more other environment components via the communication network 122. Some examples of the trusted devices 104 and the user device 110 include a laptop computer, a desktop computer, a tablet computer, a mobile telephone, a smartphone, a personal digital assistant ("PDA"), a mobile e-mail device, a portable game player, a portable music player, smart wearable technology, or any other applicable electronic device capable of accessing the communication network 122.

Each of the trusted devices 104 may be associated with one or more of the individuals 116. An association between the trusted devices 104 and the individuals 116 may include ownership or regular operation of the trusted devices 104 by the individuals 116.

The trusted devices 104 may each include a trusted device protection module 106 (hereinafter, "TD module" 106). For example, in the illustrated example, the trusted device 104A may include a TD module 106A and the trusted device 104B may include a TD module 106B. In some embodiments, the TD modules 106 may include code and routines configured to enable their respective trusted device 104 to monitor for monitored events. Additionally or alternatively, the TD module 106 may be implemented using hardware including a processor, a microprocessor (e.g., to perform or control performance of one or more operations), a field-programmable gate array (FPGA), or an application-specific integrated circuit (ASIC). In some other instances, the TD module 106 may be implemented using a combination of hardware and software.

In some embodiments, the TD modules 106 may be configured to incorporate their respective trusted devices 104 into the event monitor network 120. After incorporation into the event monitor network 120, the TD modules 106 may be configured to receive one or more input samples. The input samples may include data or information that may be used for recognition of one or more particular inputs that suggest occurrence of monitored events. For example, a particular input may include an audio alarm, a vocal expression, a visual alarm, a vibration, a visual display, or some combination thereof. Accordingly, the input samples may include a sample of the audio alarm, a sample of the vocal expression, a sample of the visual alarm, etc. of the particular input.

The trusted devices 104 be configured to measure general input (e.g., via one or more sensors included therein). For example, the trusted devices 104 may be configured to measure sound and/or to record video. The TD module 106 may be configured to direct its respective trusted device 104 to measure the general input and the TD module 106 may be configured to compare the general input to the input samples. In response to a relationship between the general input and the input sample being above a particular threshold, the TD module 106 may determine that the general input includes one of the particular inputs and may generate an event message that indicates the occurrence of a monitored event that may correspond to the observed particular input. In some embodiments, the respective trusted device 104 may be configured to communicate the event message to the user device 110 and/or the system server 124 in response to generation of the event message.

Similar to the association of the trusted devices 104 with respect to the individuals 116, the user device 110 may be associated with the user 102. An association between the user device 110 and the user 102 may include ownership or regular operation of the user device 110 by the user 102. For example, a message communicated to the user device 110 may be intended for the user 102.

The user device 110 may include a user protection module 108 (hereinafter, "user module" 108). The user module 108 may include code and routines configured to enable the user device 110 to receive notification of monitored events. Additionally or alternatively, the user module 108 may be implemented using hardware including a processor, a microprocessor (e.g., to perform or control performance of one or more operations), a FPGA, or an ASIC. In some other instances, the user module 108 may be implemented using a combination of hardware and software. Some additional details of the user module 108 are provided elsewhere herein.

The system server 124 may include a hardware server that includes a processor, memory, and network communication capabilities. In the illustrated implementation, the system server 124 is configured to communicate via the communication network 122 with the other environment components.

The system server 124 may include a system protection module 118 (hereinafter, "system module" 118). The system module 118 may include code and routines for monitoring for and notification of monitored events. Additionally or alternatively, the system module 118 may be implemented using hardware including a processor, a microprocessor (e.g., to perform or control performance of one or more operations), a FPGA, or an ASIC. In some other instances, the system module 118 may be implemented using a combination of hardware and software.

The individuals 116 that are associated with the trusted devices 104 may be affiliated with the user 102. As used herein an affiliation between the individuals 116 and the user 102 may include a financial affiliation, a geographic affiliation, an employee/employer affiliation, and the like. Because the affiliation between the individuals and the user 102, the trusted devices 104 of the individuals 116 may be well suited for observation of monitored events. For example, the individuals 116 with a geographic affiliation with the user 102 such as being a neighbor may be geographically close to property of the user 102, which may facilitate observation of the property and corresponding monitored events that may occur on the property.

In some embodiments, the system module 118 may be configured to identify one or more individuals (e.g., the individuals 116) that are affiliated with the user 102. After the individuals 116 are identified, the system module 118 may incorporate the trusted devices 104 associated with the identified, affiliated individuals 116 into the event monitor network 120.

Additionally, the system module 118 may be configured to identify one or more particular inputs that suggest the occurrences of one or more monitored events. For example, if the monitored events include a ruptured water heater that triggers an audio alarm, then the system module 118 may identify the audio alarm as the particular input that suggests a rupture of the water heater.

The system module 118 may be configured to communicate one or more input samples to the trusted devices 104. As discussed above, the one or more input may be used for recognition of one or more particular inputs from general input that may be measured by the trusted devices 104.

The system module 118 may be configured to receive an event message that may be generated by one or more of the TD modules 106. The event message may indicate the particular input is observed trusted devices 104 or sensors included therein.

In response to reception of the event message, the system module 118 may be configured to communicate an alarm message to the user device 110. The alarm message may indicate the occurrence of the monitored event suggested by the observed particular input. The alarm message may be communicated to the user module 108 and/or to a user interface of a user device 110.

In the depicted embodiment the protection system 150 includes the system module 118, the TD module 106, and the user module 108. One or more of the operations attributed herein to the system module 118 may be performed by the user module 108 and vice versa. Additionally, in some embodiments, one or more operations attributed to the TD module 106 may be performed by the user module 108 or the system module 118 and one or more operations attributed to the user module 108 or the system module 118 may be performed by the TD module 106. For example, in some embodiments, the user module 108 may receive the event message. The user module 108 may then generate an alarm message communicate the alarm message to a user interface of a user device 110.

Additionally, in some embodiments, the protection system 150 may omit the system module 118 or the user module 108. In these embodiments, all operations attributed to the system module 118 may be performed by the user module 108 or vice versa.

In the operating environment 100, memory in one or more of the environment components may be similar to memory 406 described with reference to FIG. 4, processors in one or more of the environment components may be similar to a processor 404 described with reference to FIG. 4, and network communication capabilities of one or more of the environment components may be provided by a communication unit 402 described with reference to FIG. 4.

Modifications, additions, or omissions may be made to the operating environment 100 without departing from the scope of the present disclosure. Specifically, embodiments depicted in FIG. 1 include two trusted devices 104 associated with two individuals 116, one user device 110 associated with one user 102, one system server 124, one financial server 128, one vendor server 130, and one social media server 126. The present disclosure may apply to operating environments that may include one or more trusted devices 104 associated with one or more individuals 116, one or more user devices 110 associated with one or more users 102, one or more system servers 124, one or more financial servers 128, one or more vendor servers 130, one or more social media servers 126, or some combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments the system server 124 and the financial server 128 may be a single server.

Figure 2:
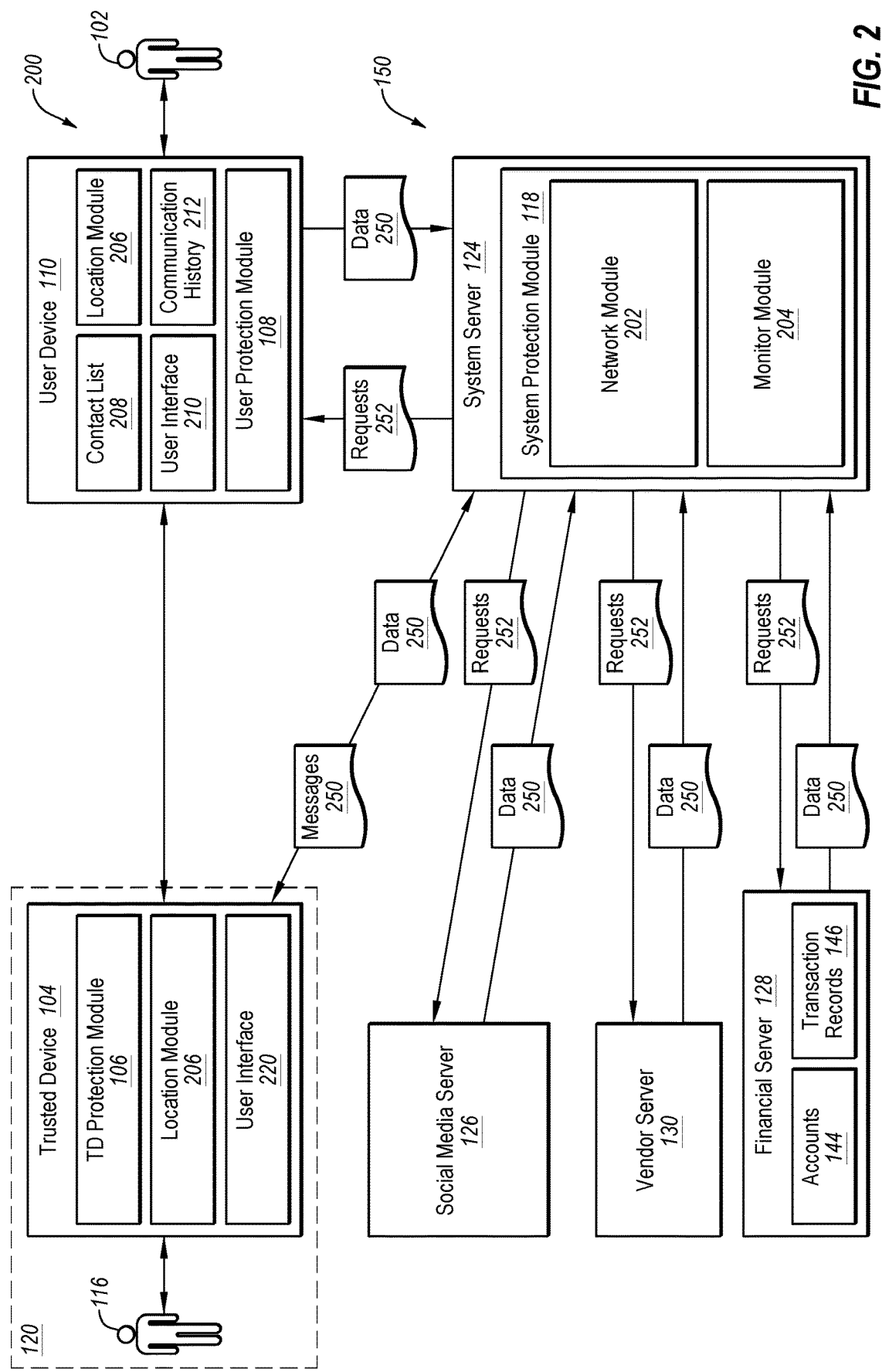
FIG. 2 illustrates an example of affiliated individual identification that may be implemented in the operating environment of FIG. 1.

FIG. 2 illustrates an example of affiliated individual identification 200 that may be implemented in the operating environment 100 of FIG. 1. FIG. 2 includes the social media server 126, the vendor server 130, the financial server 128, and the protection system 150 of FIG. 1. Although, FIG. 2 illustrates only one individual 116 and one trusted device 104, embodiments of the present disclosure are not limited to one individual 116 and/or one trusted device 104. While the communication network 122 is omitted from FIG. 2, it may be understood with the benefit of this disclosure that communication between the social media server 126, the vendor server 130, the financial server 128, and the protection system 150 may be via the communication network 122 of FIG. 1.

In FIG. 2, the system module 118 includes a network module 202 and a monitor module 204. The network module 202 may perform one or more operations of the affiliated individual identification. The monitor module 204 may perform one or more operations of event monitoring, some details of which are provided with reference to FIG. 3.

As discussed above, one or more operations attributed herein to the system module 118 may be performed by the user module 108. For instance, in some embodiments, the user module 108 may include one or both of the network module 202 and the monitor module 204.

The affiliated individual identification may be based on data that indicates an affiliation between the individual 116 and the user 102. Thus, the network module 202 may be configured to access and/or request the data and to receive the data.

The network module 202 may be further configured to determine based on the data whether an affiliation exists between the individual 116 and the user 102. For example, the network module 202 may include one or more data thresholds, above which an affiliation is deemed to exist.

Additionally, the network module 202 may be configured to determine a type of the affiliation based on the data. For example, a payment to the individual 116 from the user 102 each Friday night may indicate an employee/employer affiliation.

In the depicted affiliated individual identification 200, the affiliated individual identification may be based on data 250 representative of social network activity of the user 102, financial transactions executed by the individual 116 and executed by the user 102 at a common vendor (e.g., the vendor 140 of FIG. 1), a financial transaction executed between the individual 116 and the user 102, a pattern of common device locations, a contact list 208 of the user device 110, a request received from the user 102, a communication history 212 of the user device 110, any other data that may indicate an affiliation between the user 102 and the individual 116, or some combination thereof.

Accordingly, the network module 202 may be configured to access and/or request the data 250 indicative of an affiliation between the individual 116 and the user 102 from the user device 110, the social media server 126, the vendor server 130, the financial server 128, or some combination thereof. In FIG. 2, the access and/or requests are represented by requests 252. Additionally, the network module 202 may be configured to receive the data 250 (e.g., the contact list 208 or an affiliated individual message) from the user device 110, the social media server 126, the vendor server 130, the financial server 128, or some combination thereof.

In some embodiments, the network module 202 may be configured to generate and communicate the requests 252, which may include API calls. The API calls may include a get subroutine configured to retrieve the data 250. For example, the network module 202 may communicate an API call to the social media server 126. The API call may include a get subroutine that is configured to retrieve data 250 pertaining to social network activity that is illustrative of the affiliation between the user 102 and the individual 116. Additionally or alternatively, the network module 202 may employ a web crawler, another data gathering application, or communicate a petition message to access or request the data 250.

The network module 202 may request the data 250 pertaining to social media activity of the user 102 from the social media server 126. The network module 202 may utilize API calls or may access and search a social network account of the user 102. Some examples of the data 250 pertaining to social network activity may include photographs and videos in which the user 102 and the individual 116 are tagged, posts to data feeds of the individual 116 by the user 102, posts to a data feed of the individual 116 by the user 102, RSVPs to common calendar events by the user 102 and the individual 116, and a relationship status (e.g., a friend) of the individual 116 with relation to the user 102.

The network module 202 may be configured to identify affiliated individuals based on social media activity of the user 102. The network module 202 may determine whether an affiliation exists between the individual 116 and the user 102 based on a number of photographs or videos in which the user 102 and the individual 116 are tagged, a frequency and/or number of posts to a data feed of the individual 116 by the user 102, a frequency and/or number of posts to a data feed of the user 102 by the individual 116, a frequency and/or number of RSVPs to common calendar events by the user 102 and the individual 116, a relationship status of the individual 116 with relation to the user 102, or some combination thereof. For example, if the individual 116 has a relationship status as being a friend with the user 102 and the individual 116 and the user 102 have RSVP'd to over a threshold number (e.g., five) events in a particular area, the network module 202 may determine an affiliation exists between the individual 116 and the user 102. Moreover, the network module 202 may determine that the type of affiliation is a social friendship with the individual 116 and the user 102 socializing in a particular geographic area.

Additionally, the network module 202 may be configured to identify affiliated individuals based on the contact list 208 and/or the communication history 212. For instance, the network module 202 may obtain the contact list 208 and/or the communication history 212 from the user device 110. In some embodiments, the network module 202 may request access to the contact list 208 and/or the communication history 212. In some embodiments, the user 102 may communicate the contact list 208 and/or the communication history 212 to the system server 124. A presence of the individual 116 in the contact list 208 may be indicative of an affiliation between the user 102 and the individual 116.

The communication history 212 may include data 250 pertaining to the communication history 212 that may be indicative of an affiliation between the user 102 and the individual 116. For example, the data 250 pertaining to the communication history 212 may include a history of telephone calls, emails, text messages, and media communications between the individual 116 and the user 102. A determination of whether an affiliation exists between the individual 116 and the user 102 may be based on a number and/or frequency of telephone calls, emails, text messages, and media communications between the individual 116 and the user 102.

The network module 202 may be configured to identify affiliated individuals based on the data 250 pertaining to financial transactions. For instance, the network module 202 may access or request transaction records 146 from the financial server 128 and/or the vendor server 130. The network module 202 may parse the transaction records 146 for transactions between the individual 116 and the user 102 and/or transactions involving the individual 116 and a vendor and the user 102 and the vendor.

Additionally, the vendor server 130 and/or the financial server 128 may communicate to the network module 202 an affiliated individual message. The affiliated individual message may simply indicate to the network module 202 that there is a particular affiliation between the individual 116 and the user 102. For example, the user 102 may use the financial server 128 to pay the individual 116. Included in the financial transaction, there may be an option for the user 102 to select for the financial server 128 to send the affiliated individual message, which may lead to incorporation of the individual 116 into the event monitor network 120 as discussed elsewhere herein.

Based on the data 250 pertaining to financial transactions, the network module 202 may determine whether an affiliation exists. For example, as discussed above, an employee/employment affiliation may be determined from transactions between the individual 116 and the user 102. The employee/employment affiliations may include, for example, babysitters, house sitters, dog walkers, maintenance personnel, full-time employees, caregivers, or any other type of employee/employer affiliation. The transactions to the common vendor may be indicative of a less-formal affiliation between the individual 116 and the user 102. For instance, if the individual 116 and the user 102 both pay the same landlord (e.g., the common vendor), then the individual 116 and the user may both live at the same apartment complex or may be roommates.

The network module 202 may be configured to identify affiliated individuals based on device locations and/or patterns of device locations. The device locations may be provided by a location module 206. In FIG. 2, the trusted device 104 and the user device 110 include the location module 206. The location module 206 may include a global positioning signal (GPS) receiver or network multilateration capabilities. The location module 206 may communicate a device location to the system server 124 and/or the location module 206 may communicate the device location to the social media server 126. The device location may be posted in a data feed of a social network. The network module 202 may create a pattern of device location data based on the device locations. The network module 202 may then determine that an affiliation exists between the user 102 and the individual 116 based on commonalities between the patterns of device location data.

In some embodiments, the network module 202 may be configured to communicate an API call to the social media server 126. The API call may include a get subroutine that is configured to obtain location data of the trusted device 104 associated with the individual 116. The network module 202 may then create the pattern of device location data from the location data obtained from the social media server 126.

After the individual 116 is identified as being affiliated with the user 102, the network module 202 may incorporate the trusted device 104 into the event monitor network 120. In some embodiments, the network module 202 may communicate one or more messages 254 with the trusted device 104 to authorize incorporation of the trusted device 104 into the event monitor network 120. For example, the network module 202 may communicate an invitation message to the trusted device 104. The invitation message may request incorporation of the trusted device 104 into the event monitor network 120.

The trusted device 104 may receive the invitation message. In some embodiments, the trusted device 104 may display the invitation message on a user interface 220 of the trusted device 104. The individual 116 may view the invitation message and respond to it via the user interface 220 of the trusted device 104. For example, the trusted device 104 may receive at the user interface 220 of the trusted device 104 input that indicates a preference responsive to the invitation message. The trusted device 104 may communicate to the system server 124 a responsive message that reflects the preference of the individual 116.

The network module 202 may receive from the trusted device 104, the responsive message 254 addressing the invitation message 254. In response to the responsive message indicating that the individual 116 opts into the event monitor network 120, the network module 202 may incorporate the trusted device 104 into the event monitor network 120. In response to the responsive message 254 indicating that the individual 116 opts outs of the event monitor network 120, the network module 202 may not incorporate the trusted device 104 into the event monitor network 120. In these and other embodiments, the network module 202 may communicate an input sample to the trusted device 104 in response to the responsive message indicating that the individual 116 opts into the event monitor network 120.

In some embodiments, the incorporation into the event monitor network 120 may be pre-authorized by the individual 116. For example, during execution of a transaction using the financial server 128 or the vendor server 130, the individual 116 may pre-authorize incorporation into the event monitor network 120. In these and other embodiments, the network module 202 may communicate an input sample to the trusted device 104 with the invitation message.

In embodiments in which one or more operations attributed herein to the system module 118 are performed by the user module 108, messages 254 may be communicated between the trusted device 104 and the user module 108. Additionally, some portion of the data 250 and/or requests 252 may be communicated with the user module 108.

Figure 3:
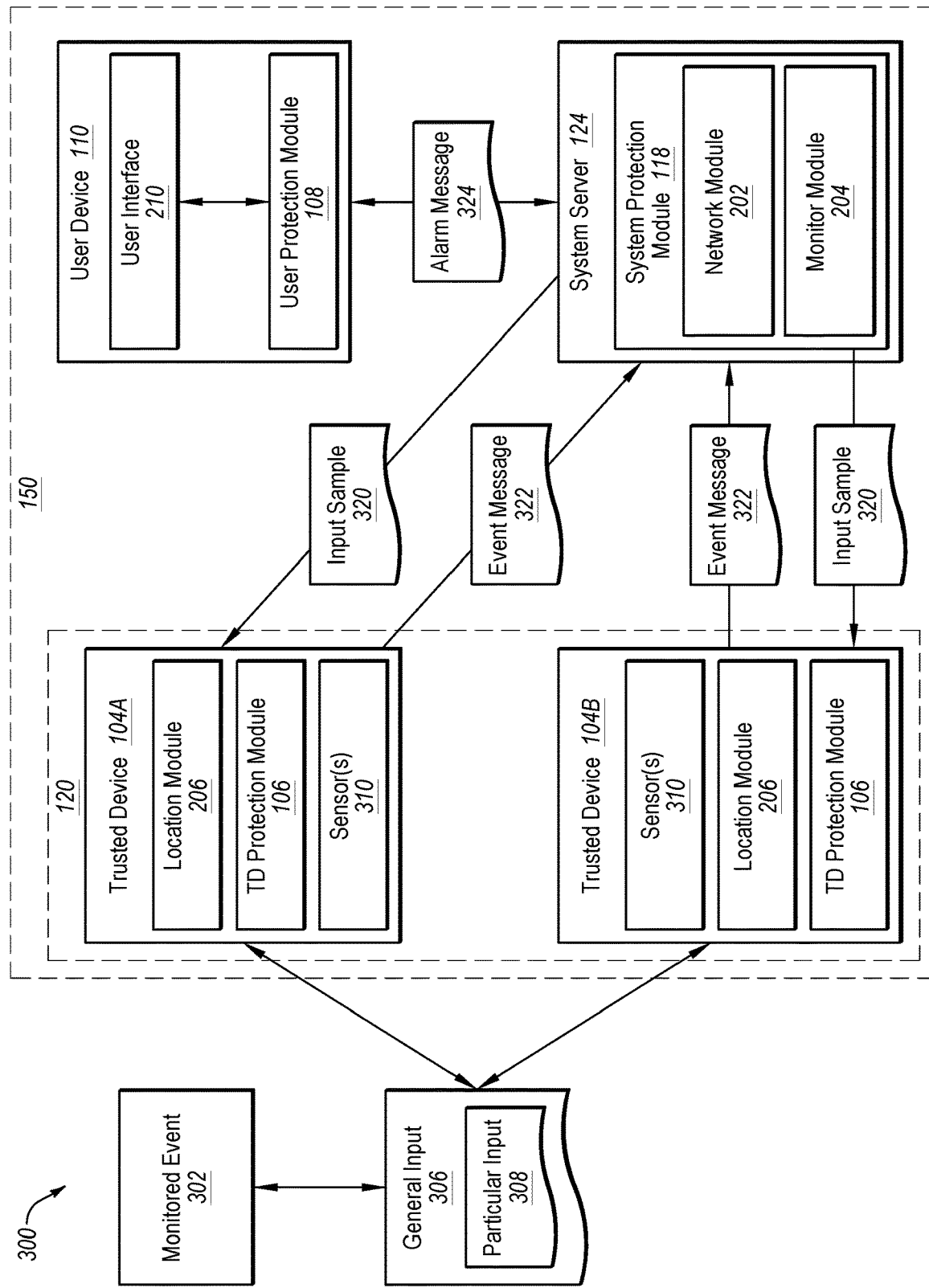
FIG. 3 illustrates an example of event monitoring that may be implemented in the operating environment of FIG. 1.

FIG. 3 illustrates an example of event monitoring 300 that may be implemented in in the operating environment 100 of FIG. 1. FIG. 3 includes the protection system 150 of FIG. 1 and a monitored event 302. In general, the monitor module 204 of the system module 118 may be configured for event monitoring. The monitor module 204 may be configured to identify the particular input 308 that suggest the occurrence of the monitored event 302.

The monitored event 302 may include any event or set of events that produces an identifiable and observable particular input. Some examples of the monitored event 302 may include a property endangerment such as a car theft, fire, earthquake, burglary; a failure of a component such as a water heater, smoke detector, power system, utility piping, carbon monoxide detector; or distress of a pet or an individual such as a child, older person, or disabled person. Generally, these examples of the monitored event 302 produce or result in an audio alarm, a visual alarm, or another particular physical phenomenon. The audio alarm, the visual alarm, or the other particular physical phenomenon may be the particular input 308 identified by the monitor module 204 because it suggests the occurrence of the monitored event 302. Accordingly, the particular input 308 may include a noise of a specific frequency, amplitude, and duration; a light flashing at a particular intensity or frequency; a voice of a person or a pet at an amplitude; silence for a duration; light associated with fire or an explosion; and the like.

After the trusted devices 104 are incorporated into the event monitor network 120, the monitor module 204 may be configured to communicate to the trusted devices 104 an input sample 320. The input sample 320 may be used for recognition of the particular input 308 from general input 306 that may be measured by one or more sensors 310 of the trusted devices 104. For example, the input sample 320 may include a digital file with specifications of the particular input 308, an example of the particular input 308, a threshold above which the general input 306 is deemed the particular input 308, or some combination thereof.

In some embodiments, the monitor module 204 may be configured to monitor for multiple monitored events (e.g., 302). In embodiments in which the monitor module 204 is configured to monitor for multiple monitored events, multiple particular inputs may be identified and multiple input samples (e.g., 320) may be communicated. The monitor module 204 may be configured to receive or generate a first input sample that may be used for recognition of a first particular input (e.g., 308) that suggests the occurrence of a first monitored event and a second input sample that may be used for recognition of a second particular input that suggests the occurrence of a second monitored event.

In some embodiments, the monitor module 204 may be configured to communicate different input samples to different trusted devices. For example, the monitor module 204 may communicate the first input sample to the first trusted device 104A and may communicate the second input sample to the second trusted device 104B.

Additionally or alternatively, the different input samples that may be communicated to different trusted devices may be based on determined types of affiliations between individuals associated therewith and the user 102. For example, a determined affiliation between an individual associated with the first trusted device 104A may include being a neighbor, the first monitored event may include a fire, and the first input sample may include a sample of a fire alarm in a house of the user 102. Additionally, a determined affiliation of an individual associated with the second trusted device 104B and the user 102 may include an employee/employer affiliation in which the individual is a babysitter for a child of the user 102, the second monitored event may include the child having an asthma attack, and the second input sample may include a sample of the child's cough at a particular amplitude for a particular time. Accordingly, the monitor module 204 may communicate the first input sample to the neighbor and the second input sample to the babysitter.

The TD modules 106 of the trusted devices 104 may receive the corresponding input sample 320. The input sample 320 may be stored on the trusted devices 104. The sensors 310 of the trusted devices 104 may be configured to measure the general input 306. In some embodiments, measuring the general input 306 may be substantially passive. For example, a particular sensor 310 may include a microphone and the microphone may remain operational without action by the individuals associated with the trusted devices. Additionally, the sensors 310 may be periodically activated (e.g., transitioned to an on state) at some interval such as every two minutes. Additionally, while the sensors 310 are being used for another function (e.g., a telephone call), the general input 306 may be being evaluated by the TD module 106. In some embodiments, the TD module 106 may be configured to direct the measuring of the general input 306.

The TD module 106 may be configured to compare the general input 306 to the input sample 320. In response to a relationship between the general input 306 and the input sample 320 being above a particular threshold, the TD module 106 may determine that the general input 306 includes the particular input 308. The TD module 106 may then generate an event message that indicates the occurrence of the monitored event 302, which in some embodiments may be communicated to the system server 124 by the respective trusted device 104.

The monitor module 204 may be configured to receive the event messages 322. In response to reception of the event messages 322, the monitor module 204 may communicate to the user device 110 an alarm message 324. The alarm message 324 may be further communicated to the user interface 210 of the user device 110.

In some embodiments, in response to reception of multiple event messages 322 from more than one of the trusted devices 104, the monitor module 204 may determine or access device locations of each of the trusted devices 104 at the time the particular input 308 was observed. Based on the locations of each of the trusted devices 104, the monitor module 204 may determine or confirm that a source of the observed particular input includes an event location associated with the monitored event 302 that also corresponds with a location associated with the user for whom the trusted devices may be performing the monitoring. In some embodiment, the event messages 322 may include the device location of the trusted device 104 communicating the event message 322.

The location associated with the monitored event 302 may include a geographic location where the monitored event 302 is likely to occur if the monitored event 302 is indeed related to the user 102. For example, the monitored event 302 may include an attempted car theft of a car that is parked at a house of the user 102. Many car alarms sound alike. Accordingly, the event messages 322 communicated from each of the trusted devices 104A and 104B may have observed the particular input 308 (e.g., the car alarm) that suggests that the car is being stolen. The monitor module 204 may access the device locations of the trusted devices 104 to determine and confirm that the trusted devices 104 were in a general proximity of the house to confirm that the monitored event 302 was observed with respect to the car of the user 102 rather than the theft of another car.

Figure 4:
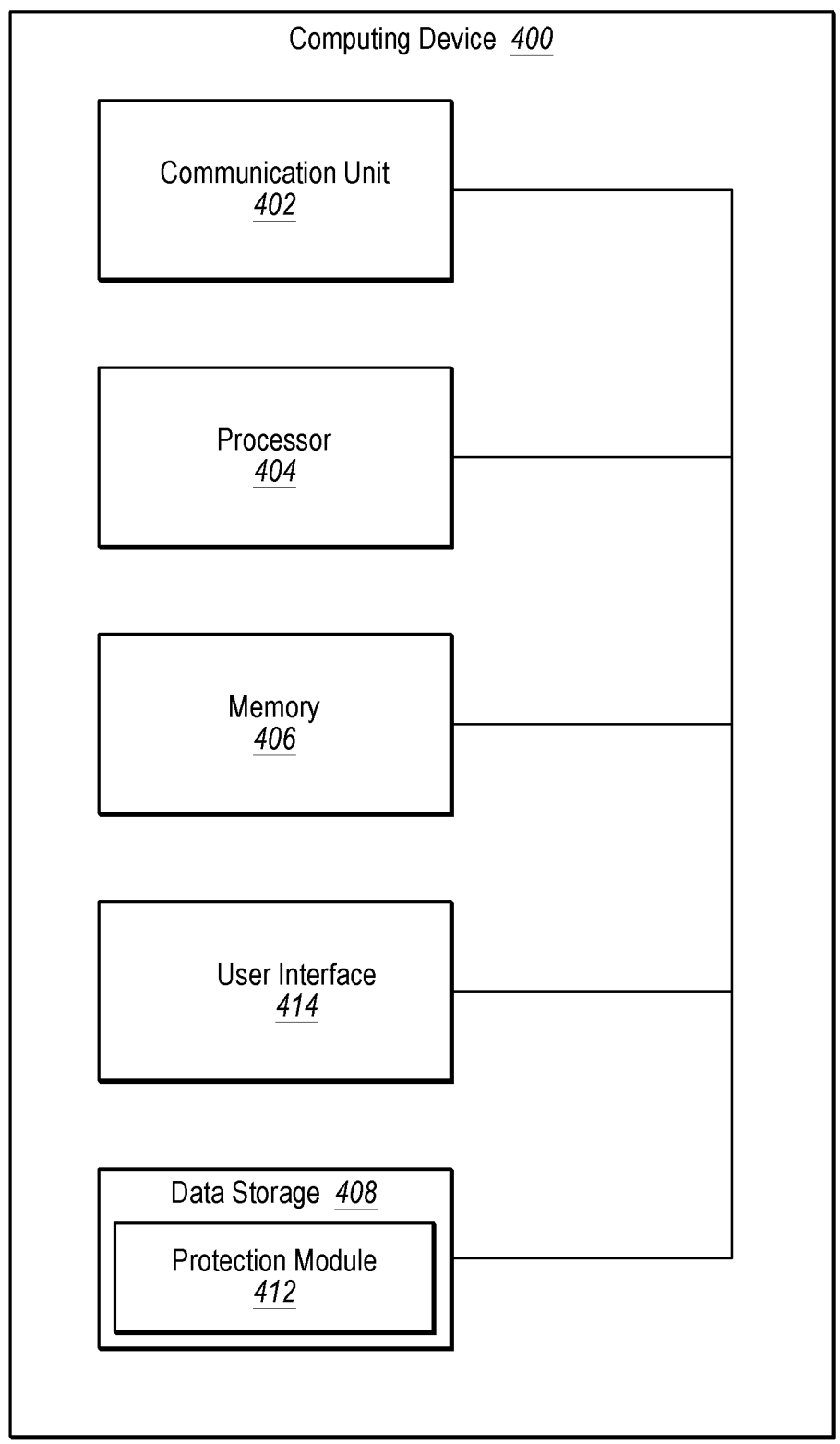
FIG. 4 illustrates an example computing system configured for event monitoring.

FIG. 4 illustrates an example computing device 400. The computing device 400 may be configured for event monitoring, arranged in accordance with at least one embodiment described herein. The computing device 400 may include one or more processors 404, a memory 406, a data storage 408 that includes a protection module 412, a communication unit 402, and a user interface 414. Some examples of the computing device 400 may include the user device 110, the system server 124, and the trusted device 104 discussed elsewhere herein. Accordingly, the protection module 412 may include the TD module 106, the system module 118, the user module 108, some portions thereof, or some combination thereof and the protection module 412 may be configured to perform one or more operations variously attributed thereto.

The processor 404 may include any suitable special-purpose or general-purpose computer, computing entity, or processing device including various computer hardware or software modules and may be configured to execute instructions stored on any applicable computer-readable storage media. For example, the processor 404 may include a microprocessor, a microcontroller, a digital signal processor (DSP), an ASIC, a FPGA, or any other digital or analog circuitry configured to interpret and/or to execute program instructions and/or to process data. Although illustrated as a single processor in FIG. 4, it is understood that the processor 404 may include any number of processors configured to perform individually or collectively any number of operations described herein. Additionally, one or more of the processors may be present on one or more different electronic devices. In some embodiments, the processor 404 may interpret and/or execute program instructions and/or process data stored in the memory 406, the data storage 408, or the memory 406 and the data storage 408. In some embodiments, the processor 404 may fetch program instructions from the data storage 408 and load the program instructions in the memory 406. After the program instructions are loaded into memory 406, the processor 404 may execute the program instructions.

The memory 406 and data storage 408 may include computer-readable storage media for carrying or having computer-executable instructions or data structures stored thereon. Such computer-readable storage media may include any available media that may be accessed by a general-purpose or special-purpose computer, such as the processor 404. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 404 to perform a certain operation or group of operations.

The communication unit 402 may include one or more pieces of hardware configured to receive and send communications. In some embodiments, the communication unit 402 may include one or more of: an antenna, a wired port, and modulation/demodulation hardware, among other communication hardware devices. In particular, the communication unit 402 may be configured to receive a communication from outside the device 400 and to present the communication to the processor 404 for event monitoring or to send a communication from the processor 404 to another device or network.

The user interface 414 may include one or more pieces of hardware configured to notify a user of the device 400 of a communication, present a communication to a user, or to notify a user of a communication and present the communication to the user. In some embodiments, the user interface 414 may include one or more of: a speaker, a microphone, a display, a keyboard, and a touch screen, among other hardware devices. In these and other embodiments, the user interface 414 may also be configured to receive input from a user of the device 400. The user input may include selecting, inputting, or inputting and selecting user preferences, among other information.

The protection module 412 may include program instructions stored in the data storage 408. The processor 404 may be configured to load the protection module 412 into the memory 406 and execute the protection module 412. When executing the protection module 412, the processor 404 may be configured to perform operations of event monitoring as described elsewhere herein.

In view of this disclosure, it will be appreciated that modifications, additions, or omissions may be made to the device 400 without departing from the scope of the present disclosure. For example, in some embodiments, the device 400 may not include the user interface 414. In these and other embodiments, the device 400 may be a server or other computing device or system that monitors for occurrence of monitored events using the communication unit 402. In some embodiments, the different components of the device 400 may be physically separate may be communicatively coupled via any suitable mechanism. For example, the data storage 408 may be part of a storage device that is separate from a server, which includes the processor 404, the memory 406, and the communication unit 402, that is communicatively coupled to the storage device.

Figure 5A:
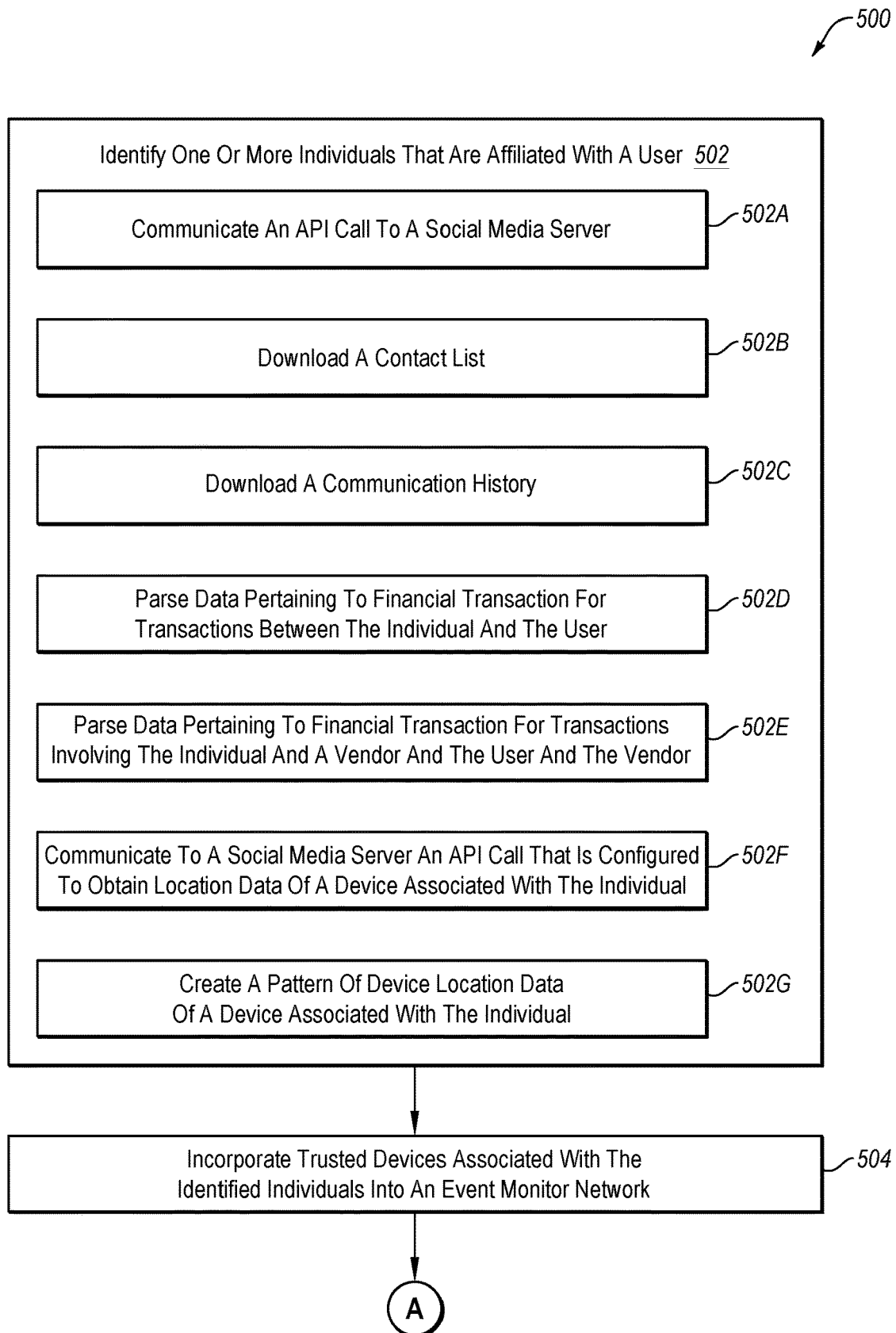
FIGS. 5A and 5B are a flowchart of an example method of event monitoring.
Figure 5B:
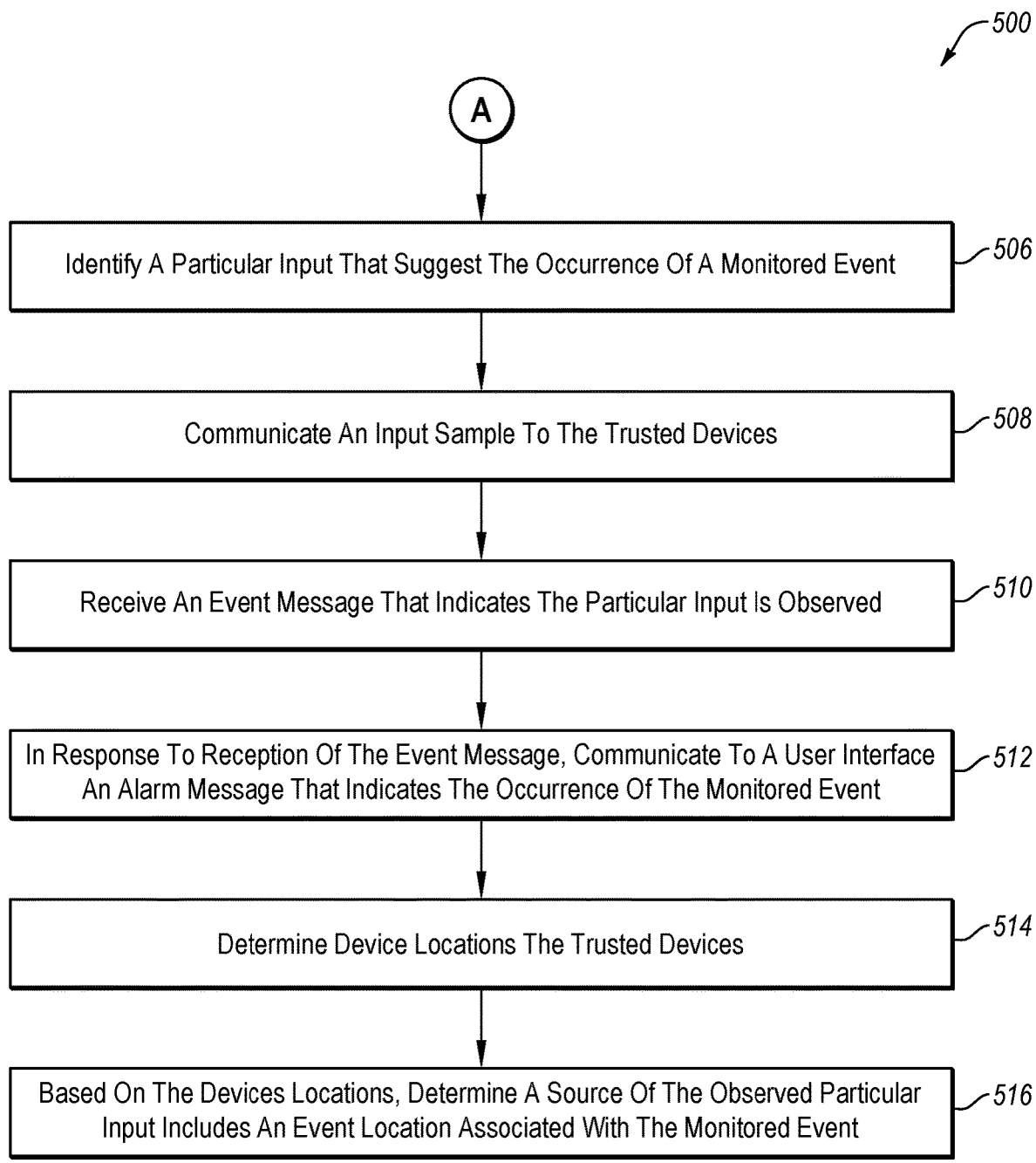

FIGS. 5A and 5B are a flowchart of an example method 500 of event monitoring, which may be arranged in accordance with at least one embodiment described herein. The method 500 may be implemented, in some embodiments, by a computing device or computing system, such as the user device 110 or the system server 124 discussed herein or the computing device 400 discussed with reference to FIG. 4. In some embodiments, the user device 110, the system server 124, or the computing device 400 may include or may be communicatively coupled to a non-transitory computer-readable medium (e.g., the memory 406 of FIG. 4) having stored thereon programming code or instructions (e.g., the protection module 412 of FIG. 4) that are executable by a processor (e.g., the processor 404 of FIG. 4) to cause the user device 110, the system server 124, or the computing device 400 to perform the method 500. Additionally or alternatively, user device 110, the system server 124, or the computing device 400 may include the processor 404 described above that is configured to execute computer instructions to cause the user device 110, the system server 124, or the computing device 400 or another computing device to perform the method 500. Although illustrated as discrete blocks, various blocks may be divided into additional blocks, combined into fewer blocks, or eliminated, depending on the desired implementation.

With reference to FIG. 5A, the method 500 may begin at block 502. At block 502, one or more individuals that are affiliated with a user may be identified. In some embodiments, an affiliation with the user is based on social network activity of the user, financial transactions executed by the individual and executed by the user at a common vendor, a financial transaction executed between an individual and the user, a pattern of common device locations, a contact list of the user device, a request received from the user, a communication history of the user device, or some combination thereof.

In some embodiments, block 502 may include one or more of blocks 502A-502G. Each of blocks 502A-502G may include a process or sub-process that may be included in block 502. At block 502A, an API call may be communicated to a social media server. The API call may include a get subroutine that is configured to retrieve data pertaining to social network activity that may be illustrative of the affiliation between the user and the individual. The data pertaining to the social media activity may include photographs and videos in which the user and the individual are tagged, posts to a data feeds of the individual and the user, RSVPs to a calendar events by the user and the individual, a relationship status of the individual with relation to the use, or some combination thereof.

At block 502B, a contact list may be downloaded. For example, the contact list may be downloaded from a user device. At block 502C, data pertaining to a communication history may be downloaded. The data pertaining to the communication history may include telephone calls, emails, text messages, and media communications between the individual and the user.

At block 502D, data pertaining to financial transactions may be parsed for transactions between the individual and the user. At block 502E, data pertaining to financial transactions may be parsed for transactions involving the individual and a vendor and the user and the vendor.

At block 502F, an API call may be communicated to a social media server. The API call may include a get subroutine that is configured to obtain location data of a device associated with the individual. At block 502G, a pattern of device location data may be created of the device associated with the individual.

At block 504, one or more trusted devices associated with the identified individuals may be incorporated into an event monitor network. The event monitor network may be configured to monitor for an occurrence of a monitored event and that is specific to the user. In some embodiments, incorporation of the trusted devices may include communicating to the trusted devices, an invitation message that requests incorporation of the trusted devices into the event monitor network and receiving from one or more the trusted devices, a responsive message addressing the invitation message. In response to the responsive message indicating that the individual associated with the trusted devices opts into the event monitor network, the trusted device may be incorporated into the event monitor network. In response to the responsive message indicating that the individual opts outs of the event monitor network, the trusted device may not be incorporated into the event monitor network.

With reference to FIG. 5B, at block 506, a particular input may be identified that suggest the occurrence of the monitored event. The particular input may include, for example, an audio alarm, a vocal expression, a visual alarm, a vibration, and a visual display. At block 508, an input sample may be communicated to the trusted devices. The input sample may be used for recognition of the particular input from general input that is measured by sensors of the trusted devices. In some embodiments, the input sample communicated to one or more of the trusted devices may be based on types of determined affiliations between individuals and the user.

The sensors may include, for example, a microphone, a camera, a vibration sensor, a smart lens, or some combination thereof. At block 510, an event message may be received. The event message may indicate the particular input is observed by one of the sensors of the trusted devices.

At block 512, an alarm message may be communicated to a user interface in response to reception of the event message. The alarm message may indicate the occurrence of the monitored event. At block 514, device locations of one or more the trusted devices may be determined. In some embodiments, the device locations may be determined in response to reception of multiple event messages from more than one of the trusted devices.

At block 516, it may be determined that a source of the observed particular input includes an event location associated with the user. The determination may be based on the devices locations of one or more of the trusted devices. In some embodiments, such determination may be used to confirm that the observed particular input does not originate at an source that is unrelated to the user.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
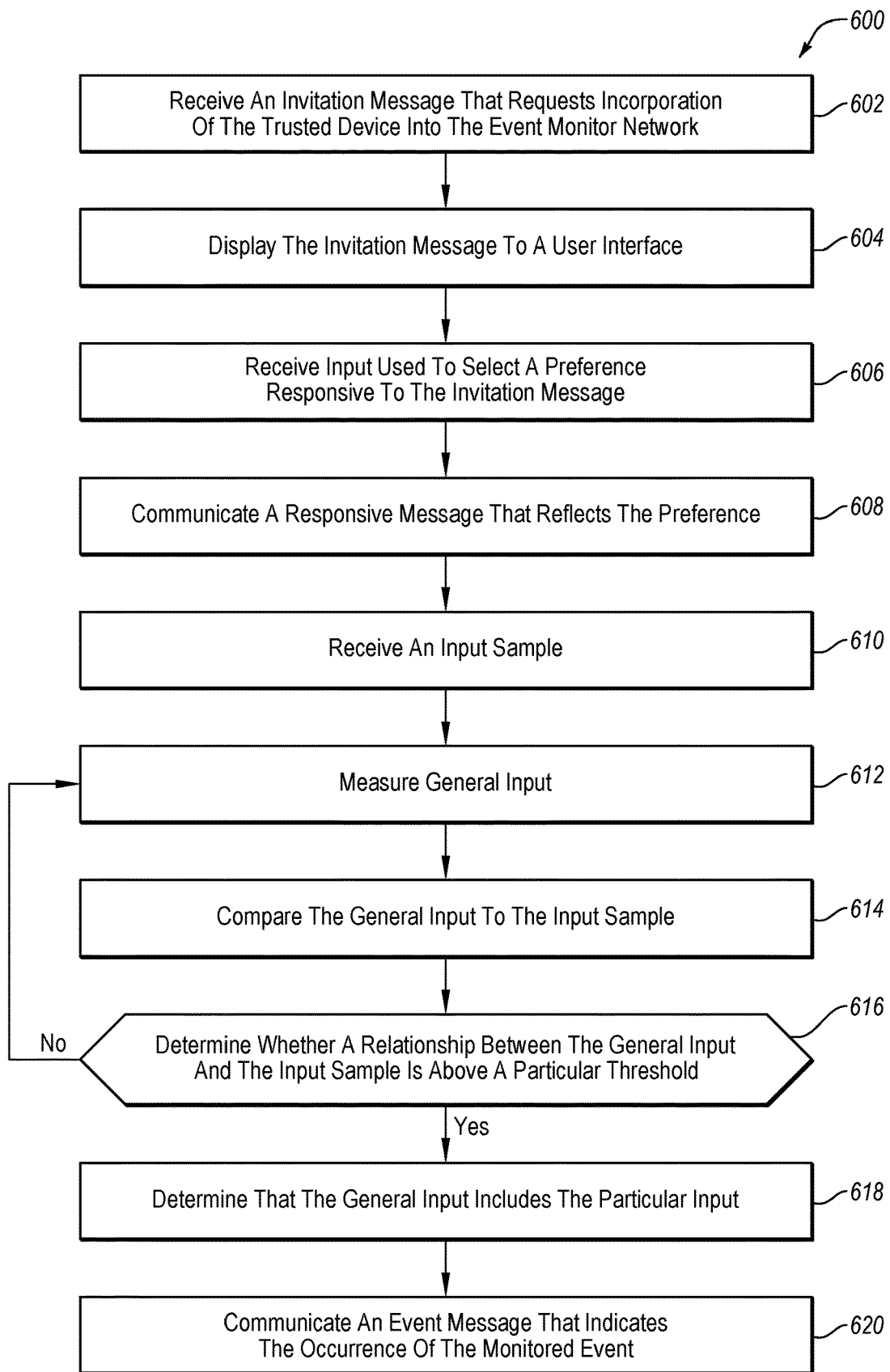
FIG. 6 is a flowchart of another example method of event monitoring.

FIG. 6 is a flowchart of another example method 600 of event monitoring, which may be arranged in accordance with at least one embodiment described herein. The method 600 may be implemented, in some embodiments, by a computing device or computing system, such as the trusted device 104 discussed herein or the computing device 400 discussed with reference to FIG. 4. In some embodiments, the trusted device 104 or the computing device 400 may include or may be communicatively coupled to a non-transitory computer-readable medium (e.g., the memory 406 of FIG. 4) having stored thereon programming code or instructions (e.g., the protection module 412 of FIG. 4) that are executable by a processor (e.g., the processor 404 of FIG. 4) to cause the trusted device 104 or the computing device 400 to perform the method 600. Additionally or alternatively, the trusted device 104 or the computing device 400 may include the processor 404 described above that is configured to execute computer instructions to cause the trusted device 104 or the computing device 400 or another computing device to perform the method 600. Although illustrated as discrete blocks, various blocks may be divided into additional blocks, combined into fewer blocks, or eliminated, depending on the desired implementation.

The method 600 may begin at block 602. At block 602, an invitation message may be received. The invitation message may request incorporation of a device into the event monitor network. At block 604, the invitation message may be displayed to a user interface. At block 606, input that may be used to select a preference responsive to the invitation message may be received. The input may be received at the user interface of a trusted device in some implementations.

At block 608, a responsive message may be communicated that reflects the preference. At block 610, an input sample may be received. The input sample may be used for recognition of a particular input from general input that is measured by a sensor. The particular input may suggest the occurrence of a monitored event. The sensor may include, for example, a microphone, a camera, a vibration sensor, and a smart lens. The particular input may include, for example, an audio alarm, a vocal expression, a visual alarm, a vibration, and a visual display.

At block 612, general input may be measured. In some embodiments, measuring the general input includes passively measuring the general input without action by the individual, periodically activating the sensor, and measuring the general input while the sensor is being used for another function.

At block 614, the general input may be compared to the input sample. At block 616, it may be determined whether a relationship between the general input and the input sample is above a particular threshold.

In response to the relationship between the general input and the input sample being below a particular threshold ("No" at block 616), the method may proceed to block 612. In response to the relationship between the general input and the input sample being above a particular threshold ("YES" at block 616), the method may proceed to block 618. At block 618, it may be determined that the general input includes the particular input. At block 620, an event message may be communicated. The event message may indicate the occurrence of the monitored event.

In some embodiments, another input sample may be received for recognition of another particular input that suggests the occurrence of another monitored event. The general input may be compared to the other input sample. In response to a relationship between the general input and the other input sample being above a particular threshold, it may be determined that the general input includes the other particular input and an event message may be communicated that indicates the occurrence of the other monitored event.

As indicated above, the embodiments described herein may include the use of a special purpose or general purpose computer (e.g., the processor 404 of FIG. 4) including various computer hardware or software modules, as discussed in greater detail below. Further, as indicated above, embodiments described herein may be implemented using computer-readable media (e.g., the memory 406 of FIG. 4) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of event monitoring comprising:
    identifying, by a first computing device, a monitored event that produces a physical phenomenon that is observable and identifiable;
    identifying, by the first computing device, a particular input that is representative of the physical phenomenon and that suggests an occurrence of the monitored event;
    incorporating, by the first computing device, a second computing device into an event monitor network that includes a plurality of additional devices,
    wherein:
        the second computing device includes a sensor configured to measure data representative of the particular input, and
        each device in the plurality of additional devices in the event monitor network is configured to passively measure general input and to monitor for the occurrence of the monitored event based on a determination that the particular input is included in the passively measured general input;
    communicating, by the first computing device to the second computing device, at least a portion of the particular input;
    receiving, at the first computing device from the second computing device, an event message that indicates the particular input is observed by the sensor of the second computing device; and
    in response to reception of the event message, generating, by the first computing device, an alarm message that indicates the occurrence of the monitored event is observed by the second computing device.

2. The method of claim 1, further comprising:
    communicating to the second computing device, an invitation message that requests incorporation of the second computing device into the event monitor network; and
    receiving from the second computing device, a responsive message addressing the invitation message,
    wherein the incorporating the second computing device into the event monitor network is performed in response to the responsive message indicating that an individual associated with the second computing device elects to participate in the event monitor network.

3. The method of claim 1, wherein each device in the plurality of additional devices stores the portion of the particular input.

4. The method of claim 1, further comprising:
    in response to reception of the event message, determining a device location of the second computing device; and
    based on the device location, determining an event location associated with the monitored event.

5. The method of claim 1, further comprising identifying an individual who is associated with the second computing device, wherein:
    the identifying the individual includes one or more operations selected from a group of operations including:
        downloading a contact list;
        downloading data pertaining to a communication history, the data pertaining to the communication history includes one or more data types selected from a group of data types including a number of telephone calls, emails, text messages, and media communications;
        and a frequency of telephone calls, emails, text messages, and media communications;
        parsing data pertaining to financial transactions for one or more transactions;
        parsing data pertaining to financial transactions for transactions involving a particular vendor;
        communicating to a social media server, an API call including a get subroutine that is configured to obtain location data of the second computing device; and
        creating a pattern of device location data of the second computing device.

6. The method of claim 1, further comprising identifying an individual who is associated with the second computing device,
    wherein:
        the identifying the individual includes communicating to a social media server, an application programming interface (API) call including a get subroutine that is configured to retrieve data pertaining to social network activity that is illustrative of an affiliation of the individual; and
        the data pertaining to the social network activity includes one or more data types selected from a group of data types including:
            a number of photographs in which the individual is tagged,
            a number of videos in which the individual is tagged,
            a frequency of posts to a data feed by the individual,
            a number of posts to a data feed by the individual,
            a frequency of RSVPs to common calendar events by the individual, a number of RSVPs to common calendar events by the individual, and
a relationship status of the individual.

7. The method of claim 1, further comprising:
identifying a second monitored event that produces a second physical phenomenon that is observable and identifiable;
identifying a second particular input that is representative of the second physical phenomenon and that suggests an occurrence of the second monitored event;
communicating, to the second computing device, at least a portion of the second particular input that is used for recognition of the second monitored event by the second computing device as measured by the sensor;
receiving, from the second computing device, a second event message that indicates the second particular input is observed by the sensor; and
in response to reception of the second event message, generating a second alarm message that indicates the occurrence of the second monitored event is observed by the second computing device,
wherein:
the monitored event includes a first monitored event of a plurality of monitored events; and
the second monitored event is different from the first monitored event.

8. The method of claim 1, further comprising:
identifying a second monitored event that produces a second physical phenomenon that is observable and identifiable;
identifying a second particular input that is representative of the second physical phenomenon and that suggests an occurrence of the second monitored event;
incorporating a third computing device that includes a sensor configured to measure data representative of the second particular input into the event monitor network;
communicating to the third computing device at least a portion of the second particular input, wherein the portion of the second particular input is used for recognition of the second monitored event by the sensor of the third computing device;
receiving, from the third computing device, a second event message that indicates the second particular input is observed by the sensor of the third computing device; and
in response to reception of the second event message, generating a second alarm message that indicates the occurrence of the second monitored event is observed by the third computing device,
wherein:
the monitored event includes a first monitored event of a plurality of monitored events;
the first computing device is associated with a first individual;
the second computing device is associated with a second individual;
the third computing device is associated with a third individual;
the second monitored event is different from the first monitored event;
the particular input is first particular input;
the communicating the first particular input to the first computing device is based on a first type of affiliation between the first individual and the second individual; and
the communicating the second particular input to the third computing device is based on a second type of affiliation between the first individual and the third individual.

9. A method of event monitoring, comprising:
receiving, at a second computing device having a sensor, a portion of a particular input from a first computing device, wherein the particular input is representative of a physical phenomenon that suggests an occurrence of a monitored event, the particular input is identified by the first computing device, and the sensor of the second computing device is configured to measure data representative of the particular input;
passively measuring, by the sensor of the second computing device, general input;
determining, by the second computing device, that the monitored event occurred based on a comparison of the received portion of the particular input with the passively measured general input; and
responsive to a determination that the monitored event occurred:
generating, by the second computing device an event message that indicates the occurrence of the monitored event as measured by the second computing device; and
communicating, by the second computing device, the event message to the first computing device.

10. The method of claim 9, further comprising:
receiving, at the second computing device, an invitation message that requests incorporation of the second computing device into an event monitor network that is configured to monitor for the occurrence of the monitored event;
displaying the invitation message to a user interface of the second computing device;
receiving, at the user interface, input used to select a preference responsive to the invitation message; and
communicating to the first computing device, a responsive message that reflects the preference,
wherein the event monitor network includes a plurality of additional devices that are each configured to monitor for the occurrence of the monitored event.

11. The method of claim 10, wherein each of the additional devices in the plurality of additional devices stores the portion of the particular input that is used for recognition of the monitored event.

12. The method of claim 9, further comprising:
comparing, by the second computing device, the measured general input to the received portion of the particular input; and
determining, by the second computing device, whether a relationship between the measured general input and the received portion of the particular input is above a particular threshold,
wherein the communicating the event message occurs in response to the relationship between the measured general input and the received portion of the particular input being above the particular threshold.

13. The method of claim 9, wherein the passively measuring the general input is performed without action by an individual associated with the second computing device and includes:
periodically activating the sensor; and
measuring the general input while the sensor is being used for another function.

14. The method of claim 9, wherein the particular input includes an audio alarm, a vocal expression, a visual alarm, a vibration, or a visual display.

15. One or more non-transitory computer-readable media storing one or more programs that are configured, in response to execution by one or more processors, to cause a system to execute or control execution of operations comprising:
   identifying a monitored event that produces a physical phenomenon that is observable and identifiable;
   identifying a particular input that is representative of the physical phenomenon and that suggests an occurrence of the monitored event;
   incorporating a second computing device into an event monitor network that includes a plurality of additional devices,
   wherein:
      the second computing device includes a sensor configured to measure data representative of the particular input, and
      each device in the plurality of additional devices in the event monitor network is configured to passively measure general input and to monitor for the occurrence of the monitored event based on a determination that the particular input is included in the passively measured general input;
   communicating to the second computing device, at least a portion of the particular input;
   receiving from the second computing device, an event message that indicates the particular input is observed by the sensor of the second computing device; and
   in response to reception of the event message, generating an alarm message that indicates the occurrence of the monitored event is observed by the second computing device.

16. The non-transitory computer-readable media of claim 15, further comprising identifying an individual who is associated with the second computing device, wherein:
   the identifying the individual includes communicating to a social media server, an application programming interface (API) call including a get subroutine that is configured to retrieve data pertaining to social network activity that is illustrative of an affiliation of the individual; and
   the data pertaining to the social network activity includes one or more data types selected from a group of data types including:
      a number of photographs in which the individual is tagged,
      a number of videos in which the individual is tagged,
      a frequency of posts to a data feed by the individual,
      a number of posts to a data feed by the individual,
      a frequency of RSVPs to common calendar events by the individual,
      a number of RSVPs to common calendar events by the individual, and
      a relationship status of the individual.

17. A protection system comprising:
   a communication network;
   a second computing device that includes a sensor; and
   a first computing device that is communicatively coupled with the second computing device via the communication network, the first comping device being configured to:
      identify a monitored event that produces a physical phenomenon that is observable and identifiable and a particular input that is representative of the physical phenomenon and that suggests an occurrence of the monitored event;
      communicate to the second computing device a portion of the particular input, the particular input being used for recognition of the monitored event by the second computing device, and the particular input being included as a portion of general input that is passively measured by the sensor;
      receive from the second computing device, an event message that indicates the particular input is observed by the sensor; and
      in response to reception of the event message, generate an alarm message that indicates the occurrence of the monitored event is observed by the second computing device,
   wherein the second computing device is configured to:
      receive the portion of the particular input;
      passively measure general input by the sensor;
      determine that the monitored event occurred based on a comparison of the received portion of the particular input with the measured general input; and
      responsive to a determination that the monitored event occurred, generate and communicate a second event message that indicates the occurrence of the monitored event as measured by the sensor of the second computing device.

18. The protection system of claim 17, wherein:
the first computing device is further configured to identify an individual who is associated with the second computing device; and
the identification of the individual includes one or more operations selected from a group of operations including:
   downloading a contact list,
   downloading data pertaining to a communication history, the data pertaining to the communication history includes one or more data types selected from a group of data types including a number of telephone calls, emails, text messages, and media communications;
and a frequency of telephone calls, emails, text messages, and media communications,
   parsing data pertaining to financial transactions for one or more transactions,
   parsing data pertaining to financial transactions for transactions involving a particular vendor,
   communicating to a social media server, an API call including a get subroutine that is configured to obtain location data of the second computing device, and
   creating a pattern of device location data of the second computing device.

19. The protection system of claim 18, wherein:
the identification of the individual includes communicating to the social media server, an application programming interface (API) call including a get subroutine that is configured to retrieve data pertaining to social network activity that is illustrative of an affiliation of the individual; and
the data pertaining to the social network activity includes one or more data types selected from a second group of data types including:
   a number of photographs in which the individual is tagged,
   a number of videos in which the individual is tagged,
   a frequency of posts to a data feed by the individual,
   a number of posts to a data feed by the individual, a frequency of RSVPs to common calendar events by the individual,
a number of RSVPs to common calendar events by the individual, and
a relationship status of the individual.

* * * * *